(12) United States Patent
Kaneshige et al.

(10) Patent No.: US 7,166,551 B2
(45) Date of Patent: Jan. 23, 2007

(54) MONOTHILIC REFRACTORY COMPOSITION

(75) Inventors: Toshihiko Kaneshige, Tokyo (JP); Hisaharu Sasaki, Tokyo (JP); Yukiharu Tabuchi, Tokyo (JP)

(73) Assignee: Shinagawa Refractories Co., Ltd., Tokyo (JP)

( * ) Notice: Subject to any disclaimer, the term of this patent is extended or adjusted under 35 U.S.C. 154(b) by 183 days.

(21) Appl. No.: 10/483,070

(22) PCT Filed: May 8, 2002

(86) PCT No.: PCT/JP02/04453

§ 371 (c)(1), (2), (4) Date: Jan. 7, 2004

(87) PCT Pub. No.: WO03/095391

PCT Pub. Date: Nov. 20, 2003

(65) Prior Publication Data

US 2005/0255986 A1    Nov. 17, 2005

(51) Int. Cl.
*C04B 35/443* (2006.01)
*C04B 35/66* (2006.01)

(52) U.S. Cl. ............ 501/120; 501/124; 501/125

(58) Field of Classification Search ........ 501/120, 501/124, 125
See application file for complete search history.

(56) References Cited

U.S. PATENT DOCUMENTS 4,244,745 A * 1/1981 Havranek et al. ......... 501/124
5,283,215 A * 2/1994 Hosokawa et al. ........ 501/120
6,274,525 B1 * 8/2001 Zborowski et al. ....... 501/120

FOREIGN PATENT DOCUMENTS

| JP | 6-172044 | 6/1994 |
| JP | 6-345550 | 12/1994 |
| JP | 11-310471 A | 11/1999 |

* cited by examiner

*Primary Examiner*—Karl Group
(74) *Attorney, Agent, or Firm*—Sughrue Mion, PLLC

(57) ABSTRACT

A subject for the invention is to provide an unshaped refractory composition having not only high thermal resistance but also improved corrosion resistance and improved unsusceptibility to slag infiltration.

The invention is "an unshaped refractory composition comprising: (1) 20 to 70% by weight raw spinel material comprising an $MgO$—$Al_2O_3$ spinel phase and containing 2 to 20% by weight magnesia and/or raw spinel/corundum material comprising an $MgO$—$Al_2O_3$ spinel phase and a corundum phase and containing 2 to 20% by weight magnesia; (2) 3 to 12% by weight raw magnesia material having a particle diameter of 0.3 mm or smaller, containing particle sizes of 75 μm or smaller in an amount of 55 to 85% by weight, and having a magnesia purity of 90% by weight or higher; (3) 3 to 10% by weight alumina cement having a calcia content lower than 20% by weight; (4) 0.3 to 1.5% by weight ultrafine powder consisting mainly of silica; and (5) a raw alumina material as the remainder".

3 Claims, No Drawings

MONOTHILIC REFRACTORY COMPOSITION

This is a National stage entry under 35 U.S.C. § 371 of PCT Application No. PCT/JP02/04453 filed May 8, 2002; the above noted application is hereby incorporated by reference.

TECHNICAL FIELD

The present invention relates to an unshaped refractory composition. More particularly, the invention relates to an unshaped refractory composition for use as a refractory for furnace lining.

BACKGROUND ART

Recently, "an alumina/spinel castable" comprising a combination of a raw alumina material and a raw spinel material and "an alumina/magnesia castable" obtained by adding magnesia to an alumina castable were developed as "refractories for the lining of furnaces used at high temperatures" such as molten-steel ladles including VOD ladles, RH vacuum degassers, tundishes for hot operating, covers of smelting furnaces, ash melting furnaces, and cement preheaters, and are being used in such applications. Of these, the "alumina/magnesia castable" is attracting attention as a material especially for ladle lining because of reduced slag infiltration, and is coming to be applied to the bottom and side wall.

Incidentally, "unshaped materials comprising a raw alumina material, raw magnesia material, alumina cement, and ultrafine silica powder" are described as "alumina/magnesia castables" in JP-A-63-218586, JP-A-2-208260, JP-A-5-185202, and JP-A-7-25669.

Compared to the alumina castable and alumina/spinel castable heretofore in use, the unshaped materials described in those patent documents are superior in corrosion resistance and unsusceptibility to slag infiltration. However, with recent changes in circumstances surrounding the iron and steel industry, the treatment of molten steels in ladles is becoming severer so as to improve steel quality, and the improvement attainable with the unshaped materials described above has reached a limit. There also are limitations on measures for the steady "need of the iron and steel industry for a refractory cost reduction by life prolongation".

Under those circumstances, the present inventors proposed "a spinel/magnesia castable obtained by compounding spinel ($MgO.Al_2O_3$) and magnesia as the main raw materials with a raw spinel material as an aggregate part and with small amounts of a raw alumina material and a raw magnesia material as fine powder parts" prior to the present application (see *Taikabutsu*, Vol. 54, No. 1 (published by the Technical Association of Refractory, Japan in January, 2002) pp. 23–24). This spinel/magnesia castable not only has high unsusceptibility to infiltration and hot-stress relaxation characteristics but also can improve corrosion resistance while inhibiting infiltration, like the alumina/spinel castable, due to the incorporation of spinel also as an aggregate part.

The invention relates to an improvement of the "spinel/magnesia castable". An object of the invention is to provide an unshaped refractory composition which, in particular, not only has high heat resistance but also has far higher corrosion resistance and unsusceptibility to slag infiltration than the alumina, alumina/spinel, or alumina/magnesia castable heretofore in use.

DISCLOSURE OF THE INVENTION

The present inventors made intensive investigations while directing attention to raw-material compositions for obtaining high corrosion resistance and high slag infiltration unsusceptibility and to the amount and particle size of magnesia to be added. As a result, they have completed the invention which is "an unshaped refractory composition which forms an appropriate liquid phase in a range of high temperatures of 1,000° C. and higher and comes to have the ability to relax an expansion stress through reactions among three ingredients, i.e., a raw material comprising an MgO—$Al_2O_3$ spinel phase or a raw material containing an MgO—$Al_2O_3$ spinel phase, an alumina cement, and an ultrafine powder consisting mainly of silica, and which not only has the property of being less apt to crack in a high-temperature range but also combines high resistance to corrosion by slag and high unsusceptibility to slag infiltration".

Namely, an unshaped refractory composition according to the invention (claim 1) is characterized by comprising:

from 20 to 70% by weight raw spinel material comprising an MgO—$Al_2O_3$ spinel phase and containing from 2 to 20% by weight magnesia and/or raw spinel/corundum material comprising an MgO—$Al_2O_3$ spinel phase and a corundum phase and containing from 2 to 20% by weight magnesia;

from 3 to 12% by weight raw magnesia material having a particle diameter of 0.3 mm or smaller, containing particle sizes of 75 μm or smaller in an amount of from 55 to 85% by weight, and having a magnesia purity of 90% by weight or higher;

from 3 to 10% by weight alumina cement having a calcia content lower than 20% by weight;

from 0.3 to 1.5% by weight ultrafine powder consisting mainly of silica; and a raw alumina material as the remainder.

Thus, the target unshaped refractory composition can be provided.

Another unshaped refractory composition according to the invention (claim 2) is characterized by comprising:

from 20 to 70% by weight raw spinel material comprising an MgO—$Al_2O_3$ spinel phase, containing from 2 to 20% by weight magnesia, and having a particle size of 1.0 mm or larger and/or raw spinel/corundum material comprising an MgO—$Al_2O_3$ spinel phase and a corundum phase, containing from 2 to 20% by weight magnesia, and having a particle size of 1.0 mm or larger;

from 3 to 12% by weight raw magnesia material having a particle diameter of 0.3 mm or smaller, containing particle sizes of 75 μm or smaller in an amount of from 55 to 85% by weight, and having a magnesia purity of 90% by weight or higher;

from 3 to 10% by weight alumina cement having a calcia content lower than 20% by weight;

from 0.3 to 1.5% by weight ultrafine powder consisting mainly of silica; and a raw alumina material as the remainder.

Thus, the target unshaped refractory composition can be likewise provided.

Furthermore, those unshaped refractory compositions according to the invention may be characterized by being for use in application by casting or application by shotcreting after having been mixed together with water (claim 3).

BEST MODE FOR CARRYING OUT THE INVENTION

The best mode for carrying out the invention will be explained next. First, the raw materials to be used for the unshaped refractory composition according to the invention (raw materials specified in the invention) are explained in detail together with their effects and advantages.

The raw spinel material to be used in the invention, which comprises an MgO—$Al_2O_3$ spinel phase, and the raw spinel/corundum material to be used in the invention, which comprises an MgO—$Al_2O_3$ spinel phase and a corundum phase, can be one or more materials which are yielded as by-products in the production of a sinter, electrofused product, or alloy. Preferred are raw materials having a magnesia content of from 2 to 20% by weight and an alumina content of from 78 to 96% by weight. In case where a raw spinel material having a chemical composition having a magnesia content higher than 20% by weight is used, this composition gives a refractory which, although excellent in heat resistance and corrosion resistance, undergoes considerable slag infiltration and is apt to peel off during heating-cooling and to suffer the so-called structural spalling. In case where a raw spinel material having a chemical composition having a magnesia content lower than 2% by weight is used, no effect of improving corrosion resistance or unsusceptibility to slag infiltration is observed although the same heat resistance is obtained.

The amount of the raw spinel material and raw spinel/corundum material to be used is from 20 to 70% by weight, preferably from 20 to 60% by weight. Addition amounts of these raw materials smaller than 20% by weight are undesirable because the effect of improving corrosion resistance and unsusceptibility to slag infiltration is low. Amounts thereof larger than 70% by weight are undesirable because the amount of the free alumina ingredient to be consumed by the conversion of the raw magnesia material, which will be described later, into spinel is reduced and, hence, magnesia remains unreacted even during high-temperature use. Consequently, the resultant refractory has reduced unsusceptibility to slag infiltration and is apt to suffer structural spalling, although excellent in heat resistance and corrosion resistance.

The raw spinel material and raw spinel/corundum material to be used preferably have a large to medium particle size of 1.0 mm or larger from the standpoint of not inhibiting the reactivity of magnesia with alumina.

Next, the raw magnesia material to be used in the invention can be one of or a mixture of two or more of naturally occurring magnesite, a burning product thereof, seawater magnesia obtained from seawater, and electrofused magnesia obtained through electrofusion which each are a fine powder or ultrafine powder having a particle size of 0.3 mm or smaller, contain particle sizes of 75 μm or smaller in an amount of from 55 to 85% by weight, and have a magnesia purity of 90% by weight or higher.

In case where the raw magnesia material has a particle size larger than 0.3 mm or contains particle sizes of 75 μm or smaller in an amount smaller than 55% by weight, the generation of spinel by the reaction of magnesia with alumina is slow and the amount of the spinel thus generated is small, making it impossible to attain bonding strength through the reaction and structural densification through reaction product diffusion. On the other hand, in case where the amount of particle sizes of 75 μm or smaller is larger than 85% by weight, the amount of closed voids which are left behind by magnesia after it diffuses and reacts with alumina to yield spinel is small. As a result, stress-relaxing properties become poor and, hence, resistance to thermal shock is weakened, resulting in peeling and damage during heating-cooling and in the so-called thermal spalling. Thus, such too high contents of the fine particles are undesirable.

As the raw magnesia material is used a high-purity one having a magnesia purity of 90% by weight or higher. Raw magnesia materials having a magnesia purity lower than 90% are undesirable because these raw materials contain a large amount of impurities such as silica, lime, and iron oxides and hence cause a decrease in corrosion resistance and a decrease in residual expansion coefficient, making it impossible to obtain a sufficient life.

The amount of the raw magnesia material to be added is from 3 to 12% by weight (preferably from 5% by weight to 9% by weight). In case where the amount of the raw magnesia material added is smaller than 3% by weight, the amount of spinel generated by the reaction of magnesia with alumina is small, making it impossible to attain bonding strength through the reaction and structural densification through reaction product diffusion. As a result, peeling or damage occurs and corrosion resistance decreases. On the other hand, in case where the amount of the raw magnesia material added is larger than 12% by weight, this composition comes into a state in which the spinel generated by the reaction of magnesia with alumina coexists with magnesia. The resultant refractory suffers uninhibited infiltration of slag to be treated and undergoes the so-called structural spalling to have a reduced life, especially when it is used for the lining of a vessel coming into contact with a molten steel, such as, e.g., a molten-steel ladle, RH vacuum degasser, or hot-operating tundish.

The alumina cement to be used in the invention can be a high-purity high-alumina cement having a calcia content lower than 20% by weight and comprising calcium aluminate and corundum as the main minerals. The amounts of this alumina cement to be added is from 3 to 10% by weight (preferably from 5 to 8% by weight). In case where an alumina cement having a calcia content higher than 20% by weight is used or where the alumina cement addition amount exceeds 10% by weight, then the reactions of this cement with the raw spinel material comprising an MgO—$Al_2O_3$ spinel phase or raw spinel/corundum material comprising an MgO—$Al_2O_3$ spinel phase and a corundum phase and with the ultrafine powder consisting mainly of silica yield a liquid phase in too large an amount. Because of this, strength in hot operating decreases abruptly and, simultaneously therewith, corrosion resistance also decreases extremely. In case where the amount of the alumina cement added is smaller than 3% by weight, the material formed by application has a low strength and a sufficient structural strength is not obtained in a low-temperature range up to 1,000° C. Because of this, the material formed by application may rupture during drying or suffer peeling or damage during use due to a gap in the structure of the material.

The invention furthermore uses an ultrafine powder consisting mainly of silica, in an amount of from 0.3 to 1.5% by weight (preferably from 0.5 to 1.2% by weight). This ultrafine powder is "an ultrafine powder having a silica value of 90% or higher" which is generally called silica flour or silica fume. It may contain a slight amount of zircon or zirconia. The purpose of addition of this ultrafine powder is to yield "a liquid phase comprising a (Ca—Al—Si) oxide system or an (Na—Mg—Si) oxide system" at the grain boundary of the dense spinel phase yielded by the reaction of magnesia with alumina to thereby enhance the stress-relaxing properties of the material formed by application.

In case where the ultrafine powder consisting mainly of silica is used in an amount smaller than 0.3% by weight, the "MgO" in the raw spinel material comprising an MgO—$Al_2O_3$ spinel phase or in the raw spinel/corundum material comprising an MgO—$Al_2O_3$ spinel phase and a corundum phase reacts with silica to consume the silica in yielding a high-melting compound. Because of this, the desired formation of an appropriate amount of the liquid phase cannot be attained and stress-relaxing properties become poor, resulting in reduced resistance to thermal spalling. On the other hand, in case where the ultrafine powder consisting mainly of silica is used in an amount larger than 1.5% by weight, the liquid phase is yielded in too large an amount, resulting in a lowered softening temperature and extremely reduced heat resistance.

The raw alumina material to be used in the invention can be one of high-purity sintered alumina and electrofused alumina or a combination of the two, or can be a calcined ultrafine alumina powder.

Furthermore, an aluminum powder, an aluminum alloy powder, a blowing agent, metal fibers, organic fibers, ceramic fibers, or a dispersant such as an alkali or alkaline earth metal salt or a polymer or copolymer thereof, e.g., a polyphosphate, polysodium acrylate, or polycalcium carboxylate, can be added according to need as long as this addition does not lessen the effects of the invention.

The application of the unshaped refractory composition according to the invention can be conducted in the following manner. Water is added in an amount of from 4 to 9% by weight to the powdery composition described above which has been introduced into a mixer. These ingredients are mixed together and the resultant mixture is introduced into a mold either directly or with a conveying hopper or a feeding machine such as a piston pump or squeeze pump. For this application by casting, an oscillating device such as a vibrator is used.

In the case where a feeding machine such as a piston pump or squeeze pump is used, it is possible to apply by shotcreting in such a manner that a spray nozzle is attached to the front end of a feeding pipe and the mixture is sprayed after having been mixed within the nozzle with an alkaline gellant sent with compressed air. In the case of this application by shotcreting, various alkaline substances can be used as the alkaline gellant to be added with compressed air. For example, use can be made of a powder of sodium silicate, potassium silicate, a sulfate, lithium, silicate, lithium carbonate, or potassium hydroxide, an aqueous solution of these, or the like. It is however desirable to use "a sodium silicate solution or a potassium silicate solution" which are on the market extensively and easily available and have satisfactory dispersibility. The amount of this alkaline gellant to be added is preferably from 0.1 to 3.0% by weight based on the mixed material to be forcedly fed.

In the case of application by casting, one or more kinds of coarse particles selected from a sintered alumina and an electrofused alumina each having an alumina content of 90% or higher and regulated so as to have a particle size of 8 mm or larger and from clinkers having a magnesia content of 20% by weight or lower and comprising a spinel or spinel/corundum mineral phase as the main constituent phase may be added to the mixture to be cast in an amount of up to 30% by weight based on the mixture. This addition does not lessen the desired effects and advantages of the invention. Consequently, this addition is within the scope of the invention.

EXAMPLES

The unshaped refractory composition of the invention will be explained below in detail by reference to Examples of the invention together with Comparative Examples, but the invention should not be construed as being limited to the following Examples.

Examples 1 to 12 and Comparative Examples 1 to 16

The formulations in Examples 1 to 12 of the invention are shown in Table 1 ((1) and (2)) and Tables 2 ((1) and (2)), and the results of each test in Examples 1 to 12 are shown in Table 3. Furthermore, the formulations in Comparative Examples 1 to 16 are shown in Table 4 ((1) to (3)) and Table 5 ((1) to (3)), and the results of each test in Comparative Examples 1 to 16 are shown in Table 6 ((1) and (2)).

The mixtures prepared according to the formulations shown in Tables 1 and 2 (Examples) and Tables 4 and 5 (Comparative Examples) each were mixed under the mixing conditions shown in Table 3 (Examples) and Table 6 (Comparative Examples). Thereafter, in Examples 1 to 3, 5, and 7 to 12 and Comparative Examples 1 to 15, the mixtures were poured into the molds (application by casting), cured, taken out from the molds, subsequently dried at 105° C. for 24 hours, and then subjected to tests. In Examples 4 and 6 and Comparative Example 16, "application by shotcreting" was conducted as shown in Table 3 and Table 6, respectively. In this application by shotcreting, each mixture was forcedly fed through a feeding pipe and applied by shotcreting after having been mixed, within a spray nozzle attached to the front end of the feeding pipe, with an alkaline gellant sent with compressed air. Thereafter, the mixture applied was likewise dried at 105° C. for 24 hours and subjected to tests. As the alkaline gellants were used a 40% by weight sodium silicate solution in Examples 4 and 6 and a 30% by weight sodium silicate solution in Comparative Example 16.

The "bending strength (MPa)", "compression strength (MPa)", and "corrosion test" shown in Tables 3 and 6 were measured by the following methods.

Bending strength: In accordance with JIS-R2553, samples which had been dried at 105° C. and samples which had been burned at 1,500° C. were examined.

Compression strength: In accordance with JIS-R2555, samples which had been dried at 105° C. and samples which had been burned at 1,500° C. were examined.

Corrosion test: A 3-hour rotating corrosion test was conducted at 1,700° C. using converter slag as a corrosive. The "corrosion depth (mm)" and "infiltration depth (mm)" were measured.

TABLE 1

Examples 1–6 (Formulation)

| | Kind of raw material | | Example 1 | Example 2 | Example 3 | Example 4 | Example 5 | Example 6 |
|---|---|---|---|---|---|---|---|---|
| Formulation A (wt %) | Spinel/corundum containing MgO = 4 wt % | 5–1 mm | 40 | — | — | — | 35 | — |
| | | below 1 mm to 0.3 mm | 25 | — | — | — | 20 | — |
| | | below 0.3 mm | — | — | — | — | 10 | — |
| | Alumina-rich spinel containing MgO = wt % | 5–1 mm | — | — | 35 | 35 | — | — |
| | | below 1 mm to 0.3 mm | — | — | 20 | 20 | — | — |
| | | below 0.3 mm | — | — | — | — | — | — |
| | Alumina-rich spinel containing MgO = 18 wt % | 5–1 mm | — | 40 | — | — | — | 35 |
| | | below 1 mm to 0.3 mm | — | 25 | — | — | — | 20 |
| | | below 0.3 mm | — | — | — | — | — | 10 |
| | Spinel containing MgO = 27 wt % | 5–1 mm | — | — | — | — | — | — |
| | Sintered alumina (Al$_2$O$_3$ = 99.5%) | 5–1 mm | — | — | — | — | — | — |
| | | below 1 mm to 0.3 mm | — | — | — | — | — | — |
| | | below 0.3 mm | — | — | — | — | — | — |
| | Electrofused alumina (Al$_2$O$_3$ = 99.0%) | 5–1 mm | — | — | — | — | — | — |
| | | below 1 mm to 0.3 mm | — | — | — | — | — | — |
| | | below 0.3 mm | 17.5 | 17.5 | 19.25 | 25.8 | 17.5 | 17.5 |
| | Calcined alumina, ultrafine powder | | 5 | 5 | 7 | 10 | 5 | 5 |
| | Seawater magnesia (MgO = 95.0%, up to 75 μm = 20%) 1.0 mm or smaller | | — | — | — | — | — | — |
| | Electrofused magnesia (MgO = 98.0%, up to 75 μm = 50%) 0.3 mm or smaller | | — | — | — | — | — | — |
| | Electrofused magnesia (MgO = 98.0%, up to 75 μm = 60%) 0.3 mm or smaller | | 7 | 7 | — | — | 7 | 7 |
| | Seawater magnesia (MgO = 95.0%, up to 75 μm = 80%) 0.3 mm or smaller | | — | — | 10 | 5 | — | — |
| | Seawater magnesia (MgO = 95.0%, up to 75 μm = 90%) 0.3 mm or smaller | | — | — | — | — | — | — |
| | Natural magnesia (MgO = 92.0%, up to 75 μm = 60%) 0.3 mm or smaller | | — | — | — | — | — | — |
| | Alumina cement A (CaO = 9.1%, Al$_2$O$_3$ = 88.0%) | | — | — | 8 | — | — | — |
| | Alumina cement B (CaO = 17.4%, Al$_2$O$_3$ = 79.7%) | | 5 | 5 | — | 3 | 5 | 5 |
| | Alumina cement C (CaO = 24.5%, Al$_2$O$_3$ = 73.9%) | | — | — | — | — | — | — |
| | Silica flour A (SiO$_2$ = 95.0%) | | 0.5 | 0.5 | 0.75 | — | 0.5 | 0.5 |
| | Silica flour B (SiO$_2$ = 90.5%) | | — | — | — | 1.2 | — | — |
| | Total | | 100 | 100 | 100 | 100 | 100 | 100 |

Examples 7–12 (Formulation)

| | Kind of raw material | | Example 7 | Example 8 | Example 9 | Example 10 | Example 11 | Example 12 |
|---|---|---|---|---|---|---|---|---|
| Formulation A (wt %) | Spinel/corundum containing MgO = 4 wt % | 5–1 mm | 50 | — | — | 40 | — | — |
| | | below 1 mm to 0.3 mm | — | — | — | 25 | — | — |
| | | below 0.3 mm | — | — | — | — | — | — |
| | Alumina-rich spinel containing MgO = 10 wt % | 5–1 mm | — | 30 | — | — | 35 | — |
| | | below 1 mm to 0.3 mm | — | — | — | — | 20 | — |
| | | below 0.3 mm | — | — | — | — | 10 | — |
| | Alumina-rich spinel containing MgO = 18 wt % | 5–1 mm | — | — | 40 | — | — | 40 |
| | | below 1 mm to 0.3 mm | — | — | — | — | — | — |
| | | below 0.3 mm | — | — | — | — | — | — |
| | Spinel containing MgO = 27 wt % | 5–1 mm | — | — | — | — | — | — |
| | Sintered alumina (Al$_2$O$_3$ = 99.5%) | 5–1 mm | — | — | — | — | — | — |
| | | below 1 mm to 0.3 mm | 10 | — | — | — | — | — |
| | | below 0.3 mm | 15.5 | — | — | — | — | — |
| | Electrofused alumina (Al$_2$O$_3$ = 99.0%) | 5–1 mm | — | — | — | — | — | — |
| | | below 1 mm to 0.3 mm | — | 25 | 20 | — | — | 20 |
| | | below 0.3 mm | — | 21.8 | 25.5 | 17.5 | 17.5 | 25.5 |
| | Calcined alumina, ultrafine powder | | 7 | 12 | — | 5 | 5 | — |
| | Seawater magnesia (MgO = 95.0%, up to 75 μm = 20%) 1.0 mm or smaller | | — | — | — | — | — | — |
| | Electrofused magnesia (MgO = 98.0%, up to 75 μm = 50%) 0.3 mm or smaller | | — | — | — | — | — | — |
| | Electrofused magnesia (MgO = 98.0%, up to 75 μm = 60%) 0.3 mm or smaller | | — | — | 6 | 7 | 7 | 6 |
| | Seawater magnesia (MgO = 95.0%, up to 75 μm = 80%) 0.3 mm or smaller | | 9 | — | — | — | — | — |
| | Seawater magnesia (MgO = 95.0%, up to 75 μm = 90%) 0.3 mm or smaller | | — | — | — | — | — | — |
| | Natural magnesia (MgO = 92.0%, up to 75 μm = 60%) 0.3 mm or smaller | | — | 7 | — | — | — | — |
| | Alumina cement A (CaO = 9.1%, Al$_2$O$_3$ = 88.0%) | | 8 | — | — | — | — | — |
| | Alumina cement B (CaO = 17.4%, Al$_2$O$_3$ = 79.7%) | | — | 3 | 8 | 5 | 5 | 8 |
| | Alumina cement C (CaO = 24.5%, Al$_2$O$_3$ = 73.9%) | | — | — | — | — | — | — |
| | Silica flour A (SiO$_2$ = 95.0%) | | — | — | — | 0.5 | 0.5 | — |
| | Silica flour B (SiO$_2$ = 90.5%) | | 0.5 | 1.2 | 0.5 | — | — | 0.5 |
| | Total | | 100 | 100 | 100 | 100 | 100 | 100 |

TABLE 2

Examples 1–6 (Formulation)

|  | Kind of raw material |  | Example 1 | 2 | 3 | 4 | 5 | 6 |
|---|---|---|---|---|---|---|---|---|
| Formulation B (parts by weight)* | Polysodium acrylate |  | 0.05 | 0.05 | 0.1 | — | — | — |
|  | Sodium hexametaphosphate |  | — | — | — | 0.1 | 0.05 | 0.05 |
|  | Organic fibers |  | 0.1 | 0.1 | 0.1 | 0.05 | — | — |
|  | Sintered alumina ($Al_2O_3$ = 99.5%) | 20–10 mm | — | — | — | — | — | — |
|  | Electrofused alumina ($Al_2O_3$ = 94.5%) | 30–10 mm | — | — | — | — | — | — |
|  | Alumina-rich spinel ($Al_2O_3$ = 90.3%) | 30–10 mm | — | — | — | — | — | — |

Examples 7–12 (Formulation)

|  | Kind of raw material |  | Example 7 | 8 | 9 | 10 | 11 | 12 |
|---|---|---|---|---|---|---|---|---|
| Formulation B (parts by weight)* | Polysodium acrylate |  | 0.1 | — | 0.08 | — | — | 0.08 |
|  | Sodium hexametaphosphate |  | — | 0.1 | — | 0.05 | 0.05 | — |
|  | Organic fibers |  | — | 0.05 | 0.1 | — | — | 0.1 |
|  | Sintered alumina ($Al_2O_3$ = 99.5%) | 20–10 mm | — | — | — | 15 | — | — |
|  | Electrofused alumina ($Al_2O_3$ = 94.5%) | 30–10 mm | — | — | — | — | 30 | — |
|  | Alumina-rich spinel ($Al_2O_3$ = 90.3%) | 30–10 mm | — | — | — | — | — | 20 |

*Formulation B is proportion (parts by weight) to 100 parts by weight of formulation A in Table 1.

TABLE 3

Examples 1–12 (Test Results)

|  |  | Example 1 | 2 | 3 | 4 | 5 | 6 | 7 | 8 | 9 | 10 | 11 | 12 |
|---|---|---|---|---|---|---|---|---|---|---|---|---|---|
| Mixing conditions: | | | | | | | | | | | | | |
| Mixing water amount (%) | | 5.5 | 6.0 | 6.5 | 7.0 | 6.5 | 5.2 | 5.5 | 5.3 | 5.0 | 5.0 | 4.5 | 8.0 |
| Application method: | | | | | | | | | | | | | |
| Application by casting or application by shotcreting | | casting | casting | casting | shotcreting | casting | shotcreting | casting | casting | casting | casting | casting | casting |
| Shotcreting conditions: | | | | | | | | | | | | | |
| Gellant amount (%) (40% sodium silicate solution) | | — | — | — | 0.40 | — | 0.25 | — | — | — | — | — | — |
| Test results | Bending strength (MPa): | | | | | | | | | | | | |
|  | after 110° C.–24 h drying | 3.8 | 3.5 | 4.8 | 4.2 | 3.3 | 4.5 | 4.1 | 4.0 | 3.8 | 4.9 | 5.3 | 5.2 |
|  | after 1500° C.–3 h burning | 18.7 | 17.6 | 16.6 | 18.5 | 17.1 | 17.9 | 15.5 | 17.8 | 16.9 | 14.6 | 13.1 | 13.8 |
|  | Compression strength (MPa): | | | | | | | | | | | | |
|  | after 110° C.–24 h drying | 25.1 | 24.4 | 32.3 | 30.5 | 22.8 | 32.2 | 30.8 | 25.5 | 24.7 | 35.8 | 38.2 | 40.4 |
|  | after 1500° C.–3 h burning | 85.1 | 82.3 | 73.6 | 88.8 | 80.7 | 80.7 | 70.4 | 87.0 | 83.4 | 81.0 | 76.4 | 78.5 |
|  | Corrosion test: | | | | | | | | | | | | |
|  | Corrosion depth (mm) | 7.5 | 4.5 | 3.5 | 4.8 | 6.3 | 3.7 | 8.0 | 5.3 | 4.9 | 5.3 | 4.5 | 4.7 |
|  | Infiltration depth (mm) | 2.0 | 2.0 | 2.5 | 2.2 | 2.3 | 2.1 | 1.7 | 1.0 | 1.2 | 2.0 | 2.0 | 1.0 |
| Remarks | | A | B | B | B | A | B | A | C | C | B | B | C |

Remarks
A: little infiltration, good
B: little fusion loss/infiltration, good
C: very little infiltration, good

TABLE 4

Comparative Examples 1–6 (Formulation)

| | Kind of raw material | | Comparative Example 1 | 2 | 3 | 4 | 5 | 6 |
|---|---|---|---|---|---|---|---|---|
| Formulation A (wt %) | Spinel/corundum containing MgO = 4 wt % | 5–1 mm | 40 | — | — | — | — | — |
| | | below 1 mm to 0.3 mm | 25 | — | — | — | — | — |
| | | below 0.3 mm | 22.5 | — | — | — | — | — |
| | Alumina-rich spinel containing MgO = wt % | 5–1 mm | — | — | — | — | 10 | — |
| | | below 1 mm to 0.3 mm | — | — | — | — | — | — |
| | | below 0.3 mm | — | — | — | — | — | — |
| | Alumina-rich spinel containing MgO = 18 wt % | 5–1 mm | — | 40 | — | — | — | 40 |
| | | below 1 mm to 0.3 mm | — | 25 | — | — | — | 25 |
| | | below 0.3 mm | — | 15 | — | — | — | — |
| | Spinel containing MgO = 27 wt % | 5–1 mm | — | — | — | 40 | — | — |
| | Sintered alumina (Al$_2$O$_3$ = 99.5%) | 5–1 mm | — | — | 40 | — | — | — |
| | | below 1 mm to 0.3 mm | — | — | 25 | — | — | — |
| | | below 0.3 mm | — | — | 15 | — | — | — |
| | Electrofused alumina (Al$_2$O$_3$ = 99.0%) | 5–1 mm | — | — | — | — | 30 | — |
| | | below 1 mm to 0.3 mm | — | — | — | 25 | 25 | — |
| | | below 0.3 mm | — | — | — | 17.5 | 17.5 | 17.5 |
| | Calcined alumina, ultrafine powder | | — | 7.5 | 7.5 | 5 | 5 | 5 |
| | Seawater magnesia (MgO = 95.0%, up to 75 μm = 20%) 1.0 mm or smaller | | — | — | — | — | — | 7 |
| | Electrofused magnesia (MgO = 98.0%, up to 75 μm = 50%) 0.3 mm or smaller | | — | — | — | — | — | — |
| | Electrofused magnesia (MgO = 98.0%, up to 75 μm = 60%) 0.3 mm or smaller | | 7 | — | 7 | 7 | — | — |
| | Seawater magnesia (MgO = 95.0%, up to 75 μm = 80%) 0.3 mm or smaller | | — | — | — | — | — | — |
| | Seawater magnesia (MgO = 95.0%, up to 75 μm = 90%) 0.3 mm or smaller | | — | — | — | — | — | — |
| | Natural magnesia (MgO = 92.0%, up to 75 μm = 60%) 0.3 mm or smaller | | — | 7 | — | — | 7 | — |
| | Alumina cement A (CaO = 9.1%, Al$_2$O$_3$ = 88.0%) | | — | — | — | — | — | — |
| | Alumina cement B (CaO = 17.4%, Al$_2$O$_3$ = 79.7%) | | 5 | 5 | 5 | 5 | 5 | 5 |
| | Alumina cement C (CaO = 24.5%, Al$_2$O$_3$ = 73.9%) | | — | — | — | — | — | — |
| | Silica flour A (SiO$_2$ = 95.0%) | | 0.5 | — | 0.5 | 0.5 | 0.5 | 0.5 |
| | Silica flour B (SiO$_2$ = 90.5%) | | — | 0.5 | — | — | — | — |
| | Total | | 100 | 100 | 100 | 100 | 100 | 100 |

Comparative Examples 7–12 (Formulation)

| | Kind of raw material | | Comparative Example 7 | 8 | 9 | 10 | 11 | 12 |
|---|---|---|---|---|---|---|---|---|
| Formulation A (wt %) | Spinel/corundum containing MgO = 4 wt % | 5–1 mm | — | — | 40 | — | — | — |
| | | below 1 mm to 0.3 mm | — | — | 25 | — | — | — |
| | | below 0.3 mm | — | — | — | — | — | — |
| | Alumina-rich spinel containing MgO = 10 wt % | 5–1 mm | — | — | — | 40 | 40 | 40 |
| | | below 1 mm to 0.3 mm | — | — | — | 25 | 25 | 25 |
| | | below 0.3 mm | — | — | — | — | — | — |
| | Alumina-rich spinel containing MgO = 18 wt % | 5–1 mm | 40 | 40 | — | — | — | — |
| | | below 1 mm to 0.3 mm | 25 | 25 | — | — | — | — |
| | | below 0.3 mm | — | — | — | — | — | — |
| | Spinel containing MgO = 27 wt % | 5–1 mm | — | — | — | — | — | — |
| | Sintered alumina (Al$_2$O$_3$ = 99.5%) | 5–1 mm | — | — | — | — | — | — |
| | | below 1 mm to 0.3 mm | — | — | — | — | — | — |
| | | below 0.3 mm | — | — | — | — | — | — |
| | Electrofused alumina (Al$_2$O$_3$ = 99.0%) | 5–1 mm | — | — | — | — | — | — |
| | | below 1 mm to 0.3 mm | — | — | — | — | — | — |
| | | below 0.3 mm | 17.5 | 17.5 | 10.5 | 20.5 | 17.5 | 10.5 |
| | Calcined alumina, ultrafine powder | | 5 | 5 | 5 | 7 | 8 | 5 |
| | Seawater magnesia (MgO = 95.0%, up to 75 μm = 20%) 1.0 mm or smaller | | — | — | — | — | — | — |
| | Electrofused magnesia (MgO = 98.0%, up to 75 μm = 50%) 0.3 mm or smaller | | 7 | — | — | — | — | — |
| | Electrofused magnesia (MgO = 98.0%, up to 75 μm = 60%) 0.3 mm or smaller | | — | — | — | — | — | — |
| | Seawater magnesia (MgO = 95.0%, up to 75 μm = 80%) 0.3 mm or smaller | | — | — | 14 | 2 | 7 | 7 |
| | Seawater magnesia (MgO = 95.0%, up to 75 μm = 90%) 0.3 mm or smaller | | — | 7 | — | — | — | — |
| | Natural magnesia (MgO = 92.0%, up to 75 μm = 60%) 0.3 mm or smaller | | — | — | — | — | — | — |
| | Alumina cement A (CaO = 9.1%, Al$_2$O$_3$ = 88.0%) | | — | — | — | — | — | — |
| | Alumina cement B (CaO = 17.4%, Al$_2$O$_3$ = 79.7%) | | 5 | 5 | 5 | 5 | 2 | 12 |
| | Alumina cement C (CaO = 24.5%, Al$_2$O$_3$ = 73.9%) | | — | — | — | — | — | — |
| | Silica flour A (SiO$_2$ = 95.0%) | | 0.5 | 0.5 | 0.5 | 0.5 | — | — |
| | Silica flour B (SiO$_2$ = 90.5%) | | — | — | — | — | 0.5 | 0.5 |
| | Total | | 100 | 100 | 100 | 100 | 100 | 100 |

TABLE 4-continued

Comparative Examples 13–16 (Formulation)

| | | | Comparative Example | | | |
|---|---|---|---|---|---|---|
| | Kind of raw material | | 13 | 14 | 15 | 16 |
| Formulation A (wt %) | Spinel/corundum containing MgO = 4 wt % | 5–1 mm | — | — | — | — |
| | | below 1 mm to 0.3 mm | — | — | — | — |
| | | below 0.3 mm | — | — | — | — |
| | Alumina-rich spinel containing MgO = 10 wt % | 5–1 mm | 40 | 40 | 40 | — |
| | | below 1 mm to 0.3 mm | 25 | 25 | — | — |
| | | below 0.3 mm | — | — | — | — |
| | Alumina-rich spinel containing MgO = 18 wt % | 5–1 mm | — | — | — | — |
| | | below 1 mm to 0.3 mm | — | — | — | — |
| | | below 0.3 mm | — | — | — | — |
| | Spinel containing MgO = 27 wt % | 5–1 mm | — | — | — | — |
| | Sintered alumina (Al$_2$O$_3$ = 99.5%) | 5–1 mm | — | — | — | — |
| | | below 1 mm to 0.3 mm | — | — | — | — |
| | | below 0.3 mm | — | — | — | — |
| | Electrofused alumina (Al$_2$O$_3$ = 99.0%) | 5–1 mm | — | — | — | 35 |
| | | below 1 mm to 0.3 mm | — | — | 20 | 20 |
| | | below 0.3 mm | 17.5 | 17.8 | 18 | 25.8 |
| | Calcined alumina, ultrafine powder | | 5 | 5 | 5 | 10 |
| | Seawater magnesia (MgO = 95.0%, up to 75 μm = 20%) 1.0 mm or smaller | | — | — | — | — |
| | Electrofused magnesia (MgO = 98.0%, up to 75 μm = 50%) 0.3 mm or smaller | | — | — | — | — |
| | Electrofused magnesia (MgO = 98.0%, up to 75 μm = 60%) 0.3 mm or smaller | | — | — | 7 | — |
| | Seawater magnesia (MgO = 95.0%, up to 75 μm = 80%) 0.3 mm or smaller | | 7 | 7 | — | 5 |
| | Seawater magnesia (MgO = 95.0%, up to 75 μm = 90%) 0.3 mm or smaller | | — | — | — | — |
| | Natural magnesia (MgO = 92.0%, up to 75 μm = 60%) 0.3 mm or smaller | | — | — | — | — |
| | Alumina cement A (CaO = 9.1%, Al$_2$O$_3$ = 88.0%) | | — | — | — | — |
| | Alumina cement B (CaO = 17.4%, Al$_2$O$_3$ = 79.7%) | | — | 5 | 8 | 3 |
| | Alumina cement C (CaO = 24.5%, Al$_2$O$_3$ = 73.9%) | | 5 | — | — | — |
| | Silica flour A (SiO$_2$ = 95.0%) | | 0.5 | 0.2 | 2.0 | — |
| | Silica flour B (SiO$_2$ = 90.5%) | | — | — | — | 1.2 |
| Total | | | 100 | 100 | 100 | 100 |

TABLE 5

Comparative Examples 1–6 (Formulation)

| | | | Comparative Example | | | | | |
|---|---|---|---|---|---|---|---|---|
| | Kind of raw material | | 1 | 2 | 3 | 4 | 5 | 6 |
| Formulation B (parts by weight)* | Polysodium acrylate | | — | — | 0.08 | — | — | — |
| | Sodium hexametaphosphate | | 0.05 | 0.1 | — | 0.05 | 0.05 | 0.05 |
| | Organic fibers | | 0.1 | 0.05 | 0.1 | — | — | — |
| | Sintered alumina (Al$_2$O$_3$ = 99.5%) | 20–10 mm | — | — | — | 20 | — | — |
| | Electrofused alumina (Al$_2$O$_3$ = 94.5%) | 30–10 mm | — | — | — | — | — | 30 |
| | Alumina-rich spinel (Al$_2$O$_3$ = 90.3%) | 30–10 mm | — | — | — | — | — | — |

Comparative Examples 7–12 (Formulation)

| | | | Comparative Example | | | | | |
|---|---|---|---|---|---|---|---|---|
| | Kind of raw material | | 7 | 8 | 9 | 10 | 11 | 12 |
| Formulation B (parts by weight)* | Polysodium acrylate | | — | — | 0.1 | — | 0.1 | 0.1 |
| | Sodium hexametaphosphate | | 0.05 | 0.05 | — | 0.05 | — | — |
| | Organic fibers | | — | — | 0.1 | 0.1 | — | — |
| | Sintered alumina (Al$_2$O$_3$ = 99.5%) | 20–10 mm | — | — | — | — | — | — |
| | Electrofused alumina (Al$_2$O$_3$ = 94.5%) | 30–10 mm | — | — | — | — | — | — |
| | Alumina-rich spinel (Al$_2$O$_3$ = 90.3%) | 30–10 mm | 15 | 15 | — | — | — | — |

Comparative Examples 13–16 (Formulation)

| | | Comparative Example | | | |
|---|---|---|---|---|---|
| | Kind of raw material | 13 | 14 | 15 | 16 |
| Formulation B | Polysodium acrylate | — | 0.08 | — | — |
| | Sodium hexametaphosphate | 0.1 | — | 0.05 | 0.1 |

TABLE 5-continued

| (parts by weight)* | Organic fibers | | 0.05 | 0.1 | — | 0.05 |
|---|---|---|---|---|---|---|
| | Sintered alumina ($Al_2O_3$ = 99.5%) | 20–10 mm | — | — | — | — |
| | Electrofused alumina ($Al_2O_3$ = 94.5%) | 30–10 mm | — | — | — | — |
| | Alumina-rich spinel ($Al_2O_3$ = 90.3%) | 30–10 mm | — | — | — | — |

*Formulation B is proportion (parts by weight) to 100 parts by weight of formulation A in Table 4.

TABLE 6

Comparative Examples 1–12 (Test Results)

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Mixing conditions: | | | | | | | | | | | | |
| Mixing water amount (%) | 6.3 | 5.5 | 5.8 | 5.5 | 5.8 | 6.0 | 6.0 | 6.0 | 6.3 | 5.8 | 7.0 | 7.0 |
| Application method: | | | | | | | | | | | | |
| Application by casting or application by shotcreting | casting | casting | casting | casting | casting | casting | casting | casting | casting | casting | casting | casting |
| Shotcreting conditions: | | | | | | | | | | | | |
| Gellant amount (%) (30% sodium silicate solution) | — | — | — | — | — | — | — | — | — | — | — | — |
| Test results — Bending strength (MPa): | | | | | | | | | | | | |
| after 110° C.-24 h drying | 2.5 | 4.2 | 4.1 | 3.9 | 3.8 | 4.1 | 4.3 | 4.5 | 5.2 | 4.3 | 0.7 | 5.4 |
| after 1500° C.-3 h burning | 14.2 | 17.1 | 19.3 | 16.2 | 15.9 | 10.2 | 12.4 | 23.5 | 16.6 | 18.8 | 4.9 | 26.7 |
| Compression strength (MPa): | | | | | | | | | | | | |
| after 110° C.-24 h drying | 20.1 | 23.9 | 27.2 | 26.0 | 25.3 | 27.0 | 28.0 | 30.0 | 33.4 | 30.0 | 8.8 | 40.3 |
| after 1500° C.-3 h burning | 65.8 | 77.1 | 88.7 | 83.5 | 78.9 | 55.3 | 60.7 | 100.9 | 68.8 | 98.7 | 19.2 | 105.8 |
| Corrosion test: | | | | | | | | | | | | |
| Corrosion depth (mm) | 7.0 | 5.1 | 13.5 | 6.0 | 12.7 | 9.9 | 8.6 | 9.1 | 4.2 | 10.2 | 12.8 | 19.2 |
| Infiltration depth (mm) | 8.2 | 7.8 | 3.3 | 15.5 | 2.8 | 5.6 | 5.4 | 5.5 | 20.9 | 13.8 | 11.2 | 3.0 |
| Remarks | D | D | E | D | E | F | G | H | D | I | J | E |

Comparative Examples 13–16 (Test Results)

| | Comparative Example | | | |
|---|---|---|---|---|
| | 13 | 14 | 15 | 16 |
| Mixing conditions: | | | | |
| Mixing water amount (%) | 6.2 | 7.2 | 6.0 | 8.0 |
| Application method: | | | | |
| Application by casting or application by shotcreting | casting | casting | casting | shotcreting |
| Shotcreting conditions: | | | | |
| Gellant amount (%) (30% sodium silicate solution) | — | — | — | 0.5 |
| Test results — Bending strength (MPa): | | | | |
| after 110° C.-24 h drying | 2.8 | 1.1 | 6.8 | 4.0 |
| after 1500° C.-3 h burning | 25.6 | 4.7 | 32.2 | 19.7 |
| Compression strength (MPa): | | | | |
| after 110° C.-24 h drying | 22.2 | 9.1 | 42.1 | 25.2 |
| after 1500° C.-3 h burning | 100.4 | 18.8 | 130.2 | 78.6 |

TABLE 6-continued

| | | | | | |
|---|---|---|---|---|---|
| | Corrosion test: | | | | |
| | Corrosion depth (mm) | 15.3 | 13.1 | 19.7 | 14.4 |
| | Infiltration depth (mm) | 4.9 | 18.2 | 2.3 | 4.5 |
| Remarks | | K | L | K | K |

Remarks
D: very poor unsusceptibility to infiltration
E: very poor unsusceptibility to fusion loss
F: poor structure, reduced life
G: poor corrosion resistance, poor unsusceptibility to infiltration
H: considerable fusion loss/infiltration, cracking
I: very poor corrosion resistance
J: poor structure, cracking
K: very poor unsusceptibility to fusion loss
L: exceeding fusion loss/infiltration It can be clearly understood from Tables 1 to 3 that according to Examples 1 to 12, which are within the range specified in the invention, unshaped refractory compositions having high thermal resistance and excellent in corrosion resistance and unsusceptibility to slag infiltration can be obtained.

In contrast, Tables 4 to 6 show that the unshaped refractory compositions of Comparative Examples 1 to 16, which are outside the range specified in the invention, gave refractories inferior in heat resistance, corrosion resistance, and/or unsusceptibility to slag infiltration.

Unshaped refractory compositions according to the invention were further subjected to the following test 1 (casting application test) and test 2 (shotcreting application test).

In test 1, the material of Comparative Example 3 was used as an ordinary alumina/magnesia casting material, and the material of Example 1 was used as an unshaped refractory composition according to the invention. In test 2, the material of Comparative Example 16 was used as an ordinary alumina/magnesia shotcreting material, and the material of Example 4 was used as an unshaped refractory composition according to the invention.

(Test 1: Casting Application Test)

Each material was applied by casting to the bottom of a molten-steel ladle. Thereafter, the ladles were used. The material according to the invention prolonged the life to 140 ch to 150 ch, compared to 100 ch to 120 ch for the ordinary alumina/magnesia casting material. Furthermore, cracking was little and no peeling occurred, making it possible to stably use the ladle with a high level for long.

(Test 2: Shotcreting Application Test)

Each material was applied by shotcreting to the barrel part of a molten-steel ladle. Thereafter the ladles were used. The material according to the invention prolonged the life until repair to 150 ch, compared to 120 ch for the ordinary alumina/magnesia shotcreting. Because of the enhanced corrosion resistance and, in particular, because the thickness of slag infiltration was reduced considerably, no metal penetration to the back side occurred at all and the total life was nearly doubled, i.e., prolonged from 240 ch to 450 ch.

INDUSTRIAL APPLICABILITY

According to the invention, an unshaped refractory composition can be provided which not only has high thermal resistance but has far higher corrosion resistance and unsusceptibility to slag infiltration than the alumina, alumina/spinel, or alumina/magnesia castable heretofore in use.

Use of the unshaped refractory composition according to the invention as a casting material produces the following marked effects. As apparent from test 1 described above, the material prolongs the life to 140 ch to 150 ch, compared to 100 ch to 120 ch for an ordinary alumina/magnesia casting material, and suffers little cracking and no peeling. Hence, stable use with a high level is possible for long.

Furthermore, use of the unshaped refractory composition according to the invention as a shotcreting material produces the following marked effects. As apparent from test 2 described above, the material prolongs the life until repair to 150 ch, compared to 120 ch for ordinary alumina/magnesia shotcreting. In addition, the material attains high corrosion resistance and, in particular, a considerable reduction in the thickness of slag infiltration. Because of these, no metal penetration to the back side occurs at all and the total life is nearly doubled, i.e., prolonged from 240 ch to 450 ch.

The invention claimed is:

1. An unshaped refractory composition comprising:
   20 to 70% by weight of (i) raw spinel material comprising an MgO—$Al_2O_3$ spinel phase and containing from 2 to 20% by weight of magnesia based on the total weight of the raw spinel material and/or (ii) raw spinet/corundum material comprising an MgO—$Al_2O_3$ spinel phase and a corundum phase and containing from 2 to 20% by weight of magnesia based on the total weight of the raw spinel/corundum material;

3 to 12% by weight of raw magnesia material having a particle diameter of 0.3 mm or smaller, containing particle sizes of 75 μm or smaller in an amount of from 55 to 85% by weight, and having a magnesia purity of 90% by weight or higher;

3 to 10% by weight of alumina cement having a calcia content of lower than 20% by weight;

0.3 to 1.5% by weight of ultrafine powder consisting mainly of silica; and a raw alumina material as a remainder.

2. An unshaped refractory composition comprising:
   20 to 70% by weight of (i) raw spinel material comprising an MgO—$Al_2O_3$ spinel phase, containing from 2 to 20% by weight of magnesia based on the total weight of the raw spinel material, and having a particle size of 1.0 mm or larger and/or (ii) raw spinet/corundum material comprising an MgO—$A_2O_3$ spinel phase and a corundum phase, containing from 2 to 20% by weight of magnesia based on the total weight of the raw spinel/corundum material, and having a particle size of 1.0 mm or larger;

3 to 12% by weight of raw magnesia material having a particle diameter of 0.3 mm or smaller, containing particle sizes of 75 μm or smaller in an amount of from 55 to 85% by weight, and having a magnesia purity of 90% by weight or higher;

3 to 10% by weight of alumina cement having a calcia content of lower than 20% by weight;

0.3 to 1.5% by weight ultrafine powder consisting mainly of silica; and a raw alumina material as a remainder.

3. The unshaped refractory composition according to claim 1 or 2, which is for use in application by casting or application by shotcreting after having been mixed together with water.

* * * * *